United States Patent
Weng et al.

(10) Patent No.: US 11,650,480 B2
(45) Date of Patent: May 16, 2023

(54) OPTICAL SYSTEM

(71) Applicant: TDK TAIWAN CORP., Taoyuan (TW)

(72) Inventors: Chih-Wei Weng, Taoyuan (TW);
Chao-Chang Hu, Taoyuan (TW);
Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 444 days.

(21) Appl. No.: 16/773,429

(22) Filed: Jan. 27, 2020

(65) Prior Publication Data

US 2021/0048609 A1 Feb. 18, 2021

Related U.S. Application Data

(60) Provisional application No. 62/887,905, filed on Aug. 16, 2019.

(30) Foreign Application Priority Data

Dec. 20, 2019 (EP) .................................... 19218896

(51) Int. Cl.
*G02B 7/09* (2021.01)
*G03B 5/00* (2021.01)
(Continued)

(52) U.S. Cl.
CPC ............... *G03B 5/00* (2013.01); *G02B 7/021* (2013.01); *G02B 7/08* (2013.01); *G02B 7/09* (2013.01);
(Continued)

(58) Field of Classification Search
CPC ........ G02B 13/00; G02B 27/00; G02B 7/182; G02B 13/0075; G02B 26/0816; G02B 26/085; G02B 27/0018; G02B 27/0068; G02B 5/005; G02B 7/04; G02B 7/1805; G02B 7/021; G02B 7/08; G02B 7/09; G02B 7/10; G02B 9/62; G02B 13/001; G02B 13/0065; G02B 27/646; G03B 11/04; G03B 11/045; G03B 17/02; G03B 2205/0015; G03B 5/00; G03B 13/36; G03B 2205/0007; G03B 2205/0053; G03B 2205/0069;
(Continued)

(56) References Cited

U.S. PATENT DOCUMENTS

2004/0228006 A1* 11/2004 Yasutomi ................. G02B 7/04
359/699
2007/0183058 A1* 8/2007 Bito ...................... G02B 15/142
359/676
(Continued)

*Primary Examiner* — Balram T Parbadia
(74) *Attorney, Agent, or Firm* — Muncy, Geissler, Olds & Lowe, P.C.

(57) ABSTRACT

An optical system is provided. The optical system includes a first optical module and a second optical module. The first optical module includes a movable portion, a fixed portion and a driving assembly. The movable portion is connected to a first optical member, and is movable relative to the fixed portion. The driving assembly is configured to drive the movable portion to move relative to the fixed portion. The second optical module is connected to a second optical member, wherein an optical axis passes through the first optical member and the second optical member.

13 Claims, 3 Drawing Sheets

(51) Int. Cl.
*G02B 9/62* (2006.01)
*G02B 13/00* (2006.01)
*G02B 27/64* (2006.01)
*H04N 5/225* (2006.01)
*G02B 7/08* (2021.01)
*H04N 5/232* (2006.01)
*G02B 7/02* (2021.01)
*G03B 13/36* (2021.01)
*G02B 7/10* (2021.01)

(52) U.S. Cl.
CPC ............... *G02B 7/10* (2013.01); *G02B 9/62* (2013.01); *G02B 13/001* (2013.01); *G02B 13/0065* (2013.01); *G02B 27/646* (2013.01); *G03B 13/36* (2013.01); *H04N 5/2253* (2013.01); *H04N 5/2254* (2013.01); *H04N 5/2257* (2013.01); *H04N 5/23287* (2013.01); *G03B 2205/0007* (2013.01); *G03B 2205/0053* (2013.01); *G03B 2205/0069* (2013.01)

(58) Field of Classification Search
CPC ... G03B 3/02; G03B 3/10; G03B 5/04; G03B 30/00; H04N 5/2253; H04N 5/2254; H04N 5/2257; H04N 5/23287; H02K 11/33; H02K 41/0356
See application file for complete search history.

(56) References Cited

U.S. PATENT DOCUMENTS

| | | | |
|---|---|---|---|
| 2012/0044589 A1* | 2/2012 | Terada | G03B 17/02 |
| | | | 359/817 |
| 2013/0057748 A1* | 3/2013 | Duparre | G02B 3/0062 |
| | | | 348/340 |
| 2018/0367714 A1* | 12/2018 | Im | H04N 5/2252 |
| 2019/0179108 A1* | 6/2019 | Kinouchi | G02B 7/10 |

* cited by examiner

OPTICAL SYSTEM

CROSS REFERENCE TO RELATED APPLICATIONS

This application claims the benefit of U.S. Provisional Application No. 62/887,905, filed Aug. 16, 2019, and claims priority of European Patent Application No. 19218896.9, filed Dec. 20, 2019, the entirety of which are incorporated by reference herein.

BACKGROUND

Technical Field

The disclosure relates to an optical system, and in particular to an optical system including a plurality of optical members, wherein some of the optical members are movable relative to some of the other optical members.

Description of the Related Art

With the development of technology, many electronic devices (such as smartphones and digital cameras) nowadays perform the functions of a camera or video recorder. The use of such electronic devices has become increasingly widespread, and these electronic devices have been designed for convenience and miniaturization to provide users with more choice.

Electronic devices with a camera or video function usually have an optical system, and light may pass through an optical member disposed in the optical system and form an image on a photosensitive member. By means of driving the optical member to move, an autofocus (AF) and/or optical image stabilization (OIS) function is achieved.

However, the arrangement of the optical system may occupy a certain amount of space, limiting the design of the electronic devices. As a result, the size of the electronic devices is usually not sufficient to meet users' requirements. Therefore, how to solve the aforementioned problem has become an important topic.

BRIEF SUMMARY

The present disclosure provides an optical system. The optical system includes a first optical module and a second optical module. The first optical module includes a movable portion, a fixed portion and a driving assembly. The movable portion is connected to a first optical member, and is movable relative to the fixed portion. The driving assembly is configured to drive the movable portion to move relative to the fixed portion. The second optical module is connected to a second optical member, wherein an optical axis passes through the first optical member and the second optical member.

In an embodiment, the optical system further includes a third optical module that is connected to a third optical member, wherein the shortest distance between the first optical module and the third optical module is shorter than the shortest distance between the second optical module and the third optical module. In an embodiment, the first optical member has a first optical area on a plane that is perpendicular to the optical axis, the second optical member has a second optical area on the plane, and the first optical area is different from the second optical area.

In an embodiment, the third optical member has a third optical area on the plane, and the third optical area is smaller than the first optical area and the second optical area. In an embodiment, the optical system further includes a fourth optical module that is connected to a fourth optical member, wherein the third optical module is located between the first optical module and the fourth optical module, the fourth optical member has a fourth optical area on the plane, and the fourth optical area is greater than the first optical area. In an embodiment, the fourth optical area is smaller than the second optical area.

In an embodiment, the fourth optical member has a first area on a plane that is perpendicular to the optical axis and has a second area on a plane that is parallel to the optical axis, and the first area is smaller than the second area. In an embodiment, the second area is smaller than the second optical area.

In an embodiment, the optical system further includes a fifth optical module that is connected to a fifth optical member, wherein the shortest distance between the first optical module and the fifth optical module is longer than the shortest distance between the second optical module and the fifth optical module. In an embodiment, the fifth optical member has a fifth optical area on the plane, and the fifth optical area is smaller than the second optical area.

In an embodiment, the second optical member has at least one cutting portion, the fifth optical member has a lengthwise side, and the length of the lengthwise side is greater than the normal length, which is perpendicular to the cutting portion. In an embodiment, the optical system further includes a sixth optical module that is located between the fifth optical module and the second optical module.

In an embodiment, the first optical module is connected to a plurality of first optical members, one of the first optical members includes a first material, another of the first optical members includes a second material, and the first material is different from the second material. In an embodiment, the first optical member is closer to the third module than the other first optical member, and the refractivity of the first material is less than the refractivity of the second material.

In an embodiment, the first optical module is movable relative to the second optical module, and the third optical module is connected to the first optical module. In an embodiment, the first optical module is movable relative to the second optical module, and the third optical module is connected to the second optical module. In an embodiment, the shape of the first optical member is different from the shape of the second optical member.

In an embodiment, the optical system further includes a connecting member, wherein the fixed portion is bonded to the second optical module via the connecting member. In an embodiment, each of the fixed portion and the second optical module has a surface, the surfaces are disposed to face each other, and the connecting member is disposed on the surfaces. In an embodiment, light travels to the first optical member via the second optical member.

BRIEF DESCRIPTION OF THE DRAWINGS

The disclosure can be more fully understood by reading the subsequent detailed description and examples with references made to the accompanying drawings, wherein.

DETAILED DESCRIPTION OF THE INVENTION

The optical systems of some embodiments of the present disclosure are described in the following description. However, it should be appreciated that the following detailed description of some embodiments of the disclosure provides various concepts of the present disclosure which may be performed in specific backgrounds that can vary widely. The specific embodiments disclosed are provided merely to clearly describe the usage of the present disclosure by some specific methods without limiting the scope of the present disclosure.

In addition, relative terms such as "lower" or "bottom," "upper" or "top" may be used in the following embodiments in order to describe the relationship between one element and another element in the figures. It should be appreciated that if the device shown in the figures is flipped upside-down, the element located on the "lower" side may become the element located on the "upper" side.

It should be understood that although the terms "first," "second," etc. may be used herein to describe various elements, materials and/or portions, these elements, materials and/or portions are not limited by the above terms. These terms merely serve to distinguish different elements, materials and/or portions. Therefore, a first element, material and/or portion may be referred to as a second element, material and/or portion without departing from the teaching of some embodiments in the present disclosure.

Unless defined otherwise, all terms (including technical and scientific terms) used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure. In addition, the terms "substantially," "approximately" or "about" may also be recited in the present disclosure, and these terms are intended to encompass situations or ranges that is substantially or exactly the same as the description herein. It should be noted that unless defined specifically, even if the above terms are not recited in the description, it should be read as the same meaning as those approximate terms are recited.

Figure 1:
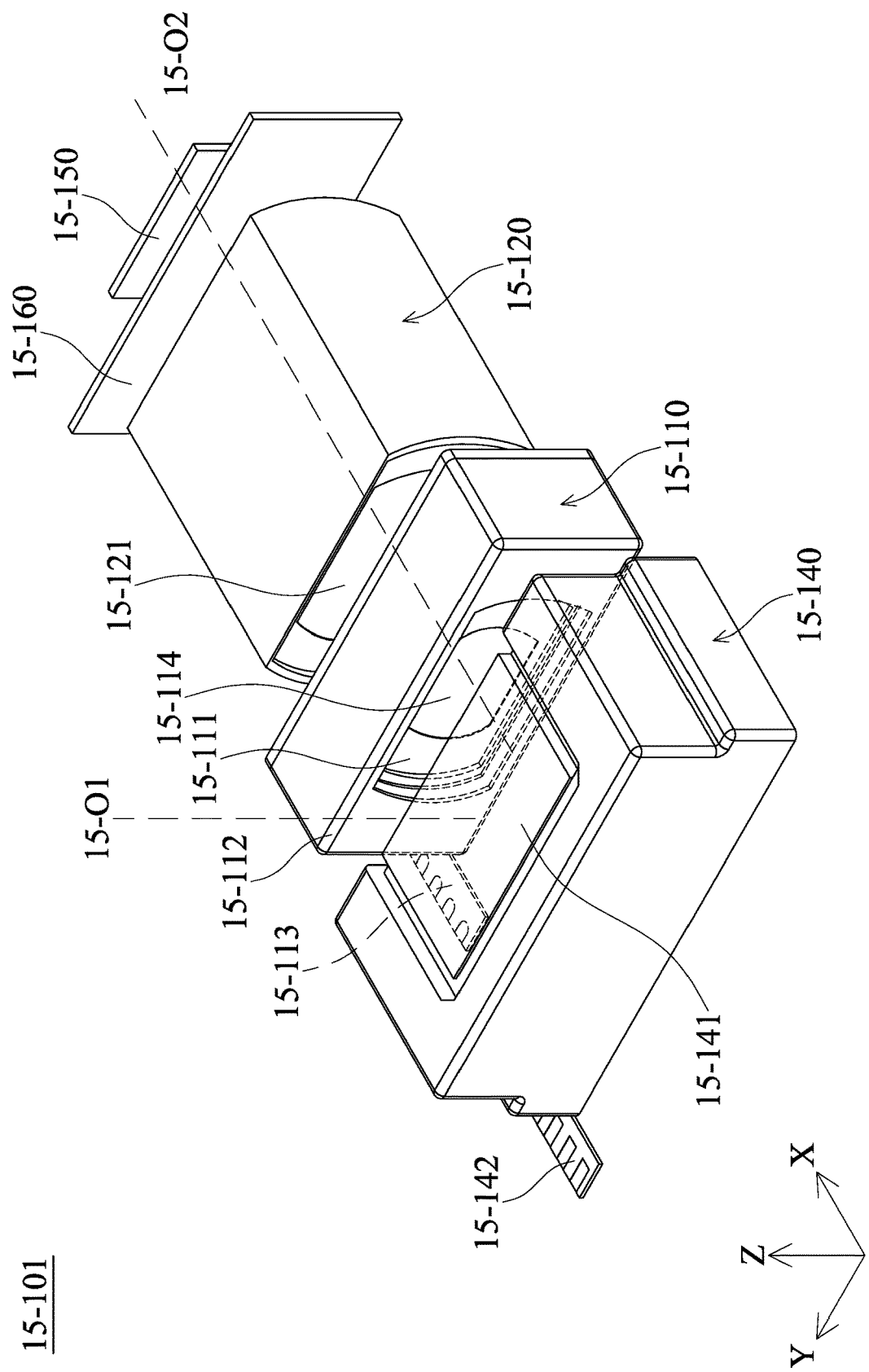
FIG. 1 is a perspective view illustrating an optical system in accordance with an embodiment of the present disclosure.

FIG. 1 is a schematic perspective view illustrating an optical system 15-101 in accordance with an embodiment of the present disclosure. It should be noted that, in this embodiment, the optical system 15-101 may be, for example, disposed in the electronic devices (not shown) with camera function, and a driving assembly inside the optical system may be configured to drive an optical member to move. Controlling the position of the optical member can perform an autofocus (AF) and/or optical image stabilization (OIS) function.

Figure 2:
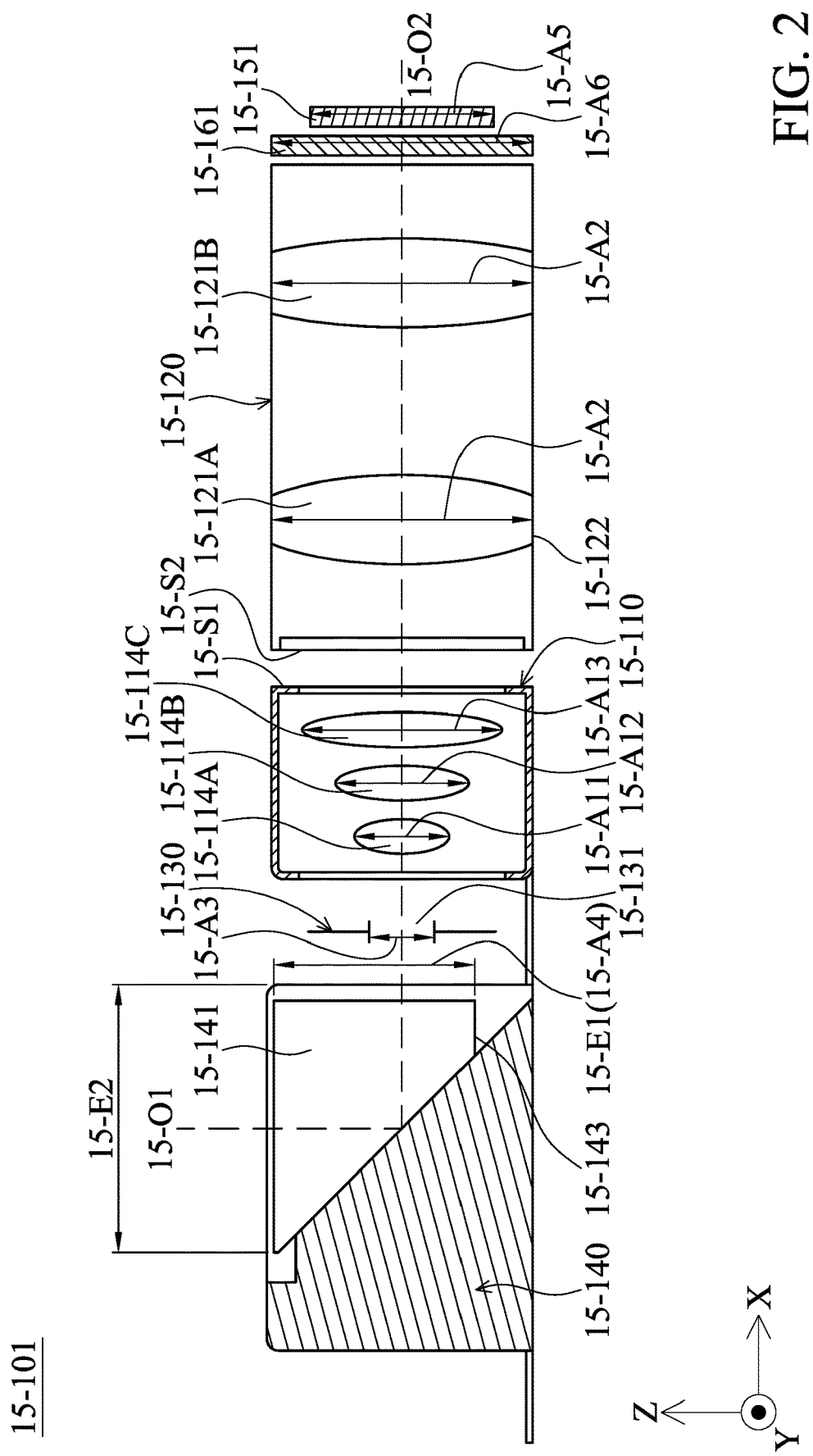
FIG. 2 is a cross-sectional view illustrating the optical system shown in FIG. 1.

As shown in FIG. 1, the optical system 15-101 includes a first optical module 15-110, a second optical module 15-120, a third optical module 15-130 (as shown in FIG. 2), a fourth optical module 15-140, a fifth optical module 15-150 and a sixth optical module 15-160, all of which correspond to each other. The optical system 15-101 has a first optical axis 15-O1, which is substantially parallel to the Z axis. The optical system 15-101 further has a second optical axis 15-O2, which is substantially perpendicular to the first optical axis 15-O1. After light enters the optical system 15-101 along the first optical axis 15-O1, the direction of the light is changed and the light travels along the second optical axis 15-O2. In some embodiments, the first optical axis 15-O1 is not parallel to the second optical axis 15-O2.

In the present embodiment, the fourth optical module 15-140 includes a driving assembly 15-142. Light may enter the fourth optical module 15-140 along the first optical axis 15-O1, and a fourth optical member 15-141 that is connected to the fourth optical module 15-140 may change the direction of the light which travels along the second optical axis 15-O2. The driving assembly 15-142 may drive the fourth optical member 15-141 to move, and thereby the path of the light may be adjusted, performing an autofocus (AF) and/or optical image stabilization (OIS) function.

After the light turns to the second optical axis 15-O2, it may pass through the first optical module 15-110, the second optical module 15-120, the sixth optical module 15-160 and the fifth optical module 15-150 in order. In other words, the fourth optical module 15-140, the first optical module 15-110, the second optical module 15-120, the sixth optical module 15-160 and the fifth optical module 15-150 are sequentially arranged along the second optical axis 15-O2. As a result, the shortest distance between the first optical module 15-110 and the fifth optical module 15-150 is longer than the shortest distance between the second optical module 15-120 and the fifth optical module 15-150. The sixth optical module 15-160 may be located between the fifth optical module 15-150 and the second optical module 15-120.

In some embodiments, the first optical module 15-110 includes a movable portion 15-111, a fixed portion 15-112 and a driving assembly 15-113, wherein the movable portion 15-111 is configured to connect the first optical member 15-114. The driving assembly 15-113 may drive the movable portion 15-111 to move relative to the fixed portion 15-112, and therefore performing an autofocus (AF) and/or optical image stabilization (OIS) function. The second optical module 15-120 is configured to connect the second optical member 15-121, wherein the second optical member 15-121 corresponds to the first optical member 15-114. For example, the second optical axis 15-O2 may pass through the first optical member 15-114 and the second optical member 15-121. The first optical member 15-114 is movable relative to the second optical member 15-121, and may achieve different optical characteristics, as required.

Since some of the optical members (such as the first optical member 15-114) are movable, the design of the driving assembly 15-113 may be simplified or the required space of the driving assembly 15-113 may be reduced, achieving the miniaturization of the optical system 15-101.

In some embodiments, an image sensor may be, for example, connected to the fifth optical module 15-150, and therefore the light entering the optical system 15-101 may form an image after reaching the fifth optical module 15-150. In some embodiments, a light filter may be connected to the sixth optical module 15-160, and therefore the optical characteristics of the optical system 15-101 may be improved. In some embodiments, the sixth optical module 15-160 may be optionally disposed. In some embodiments, the sixth optical module 15-160 may be substituted as a shutter, or a shutter may be disposed between the sixth optical module 15-160 and the fifth optical module 15-150.

FIG. 2 is a cross-sectional view illustrating the optical system 15-101 shown in FIG. 1. As shown in FIG. 2, the third optical module 15-130 is located between the first optical module 15-110 and the fourth optical module 15-140, and is configured to connect a third optical module 15-131. As a result, the shortest distance between the first optical module 15-110 and the third optical module 15-130 is shorter than the shortest distance between the second optical module 15-120 and the third optical module 15-130. In some embodiments, the third optical module 15-130 is connected to the first optical module 15-110 and movable relative to the second optical module 15-120. In some other embodiments, the third optical module 15-130 is connected to second optical module 15-120, and the first optical module 15-110 is movable relative to the second optical module 15-120 and the third optical module 15-130.

It should be noted that the term "optical area" may be used in the following paragraphs and refers to the largest region that light may pass through in each element. Although the present embodiment merely shows a cross-section view of the optical system 15-101, those skilled in the art should realize the proportional relationships between each "optical area" and "area" discussed in the present disclosure.

In the present embodiment, the fourth optical member 15-141 has a first area 15-E1 (i.e. a fourth optical area 15-A4) on a plane that is perpendicular to the second optical axis 15-O2 (namely, parallel to the first optical axis 15-O1). A second area 15-E2 is provided on a plane that is perpendicular to the first optical axis 15-O1 (namely, parallel to the second optical axis 15-O2). It should be noted that the first area 15-E1 is smaller than the second area 15-E2 because the fourth optical member 15-141 has a cutting portion 15-143 below. By setting the cutting portion 15-143, the weight of the fourth optical member 15-141 can be reduced without affecting the optical properties, and the effect of reducing the weight of the optical system 15-101 can be achieved.

The third optical module 15-130 is connected to the third optical member 15-131. For example, the third optical member 15-131 is an aperture, but the disclosure is not limited thereto. The third optical member 15-131 has a third optical area 15-A3 on a plane that is perpendicular to the second optical axis 15-O2. In the present embodiment, the third optical area 15-A3 is smaller than the fourth optical area 15-A4.

As shown in FIG. 2, the first optical module 15-110 is connected to the first optical members 15-114A, 15-114B and 15-114C with different sizes. The first optical members 15-114A, 15-114B and 15-114C have first optical areas 15-A11, 15-A12, and 15-A13 of different sizes, respectively. In the present embodiment, the first optical area 15-A11 is smaller than the first optical area 15-A12, and the first optical area 15-A12 is smaller than the first optical area 15-A13. The fourth optical area 15-A4 is larger than the first optical areas 15-A11, 15-A12 and 15-A13, and the third optical area 15-A3 is smaller than the first optical areas 15-A11, 15-A12 and 15-A13. It should be understood that although the first optical members 15-114A, 15-114B and 15-114C are shown as ovals in the present embodiment, the first optical members 15-114A, 15-114B and 15-114C may also be disposed as other shapes.

In this embodiment, the first optical member 15-114A is closer to the third optical module 15-130 than the first optical member 15-114B. For example, the material of the first optical member 15-114A includes plastic, and the material of the first optical member 15-114B includes glass, but is not limited thereto. In some embodiments, the refractive index of the material of the first optical member 15-114A is smaller than the refractive index of the material of the first optical member 15-114B.

The second optical module 15-120 is connected to the second optical members 15-121A and 15-121B. The second optical members 15-121A and 15-121B have a second optical area 15-A2. In this embodiment, the second optical members 15-121A and 15-121B have at least one cutting portion 15-122, respectively, to remove redundant portions of the second optical members 15-121A and 15-121B. By means of the arrangement of the cutting portion 15-122, the size of the second optical members 15-121A, 15-121B can be reduced without affecting the optical properties, and the miniaturization of the optical system 15-101 can be achieved. Since the first optical members 15-114A, 15-114B, and 15-114C are not cut at all, the shapes of the first optical members 15-114A, 15-114B and 15-114C are different from the shapes of the second optical members 15-121A and 15-121B in the present embodiment.

It should be noted that the original dimensions (that is, the dimensions when the cutting portion 15-122 is not formed) of the second optical members 15-121A, 15-121B may be different, and it may be determined based on the surface curvature of the second optical members 15-121A, 15-121B. As shown in FIG. 2, the second optical area 15-A2 may be larger than the fourth optical area 15-A4, and further larger than the first optical areas 15-A11, 15-A12, 15-A13 and the third optical area 15-A3. Furthermore, in some embodiments, the second optical area 15-A2 may be larger than the second area 15-E2 of the fourth optical member 15-141.

The first optical module 15-110 includes a first surface 15-S1, and the second optical module 15-120 includes a second surface 15-S2. The first surface 15-S1 faces the second surface 15-S2. In some embodiments, the first optical module 15-110 (such as the fixed portion 15-112) and the second optical module 15-120 are connected to each other via a connecting element (not shown), and the aforementioned connecting element may be disposed on the first surface 15-S1 and the second surface 15-S2. In addition, although in this embodiment, the light passes through the first optical module 15-110 and then enters the second optical module 15-120, it merely serves as an example. Those skilled in the art may adjust the positions of the first optical module 15-110 and the second optical module 15-120 as required, such that light passes through the second optical member 15-121 before entering the first optical member 15-114.

A sixth optical member 15-161 may be connected to the sixth optical module 15-160 (as shown in FIG. 1), wherein the sixth optical member 15-161 has a sixth optical area 15-A6. In the present embodiment, the sixth optical area 15-A6 is substantially equal to the second optical area 15-A2. A fifth optical member 15-151 may be connected to the fifth optical module 15-150 (as shown in FIG. 1), wherein the fifth optical member 15-151 has a fifth optical area 15-A5. In this embodiment, the fifth optical area 15-A5 is smaller than the second optical area 15-A2. In other embodiments, the fifth optical area 15-A5 may be substantially equal to the second optical area 15-A2.

Figure 3:
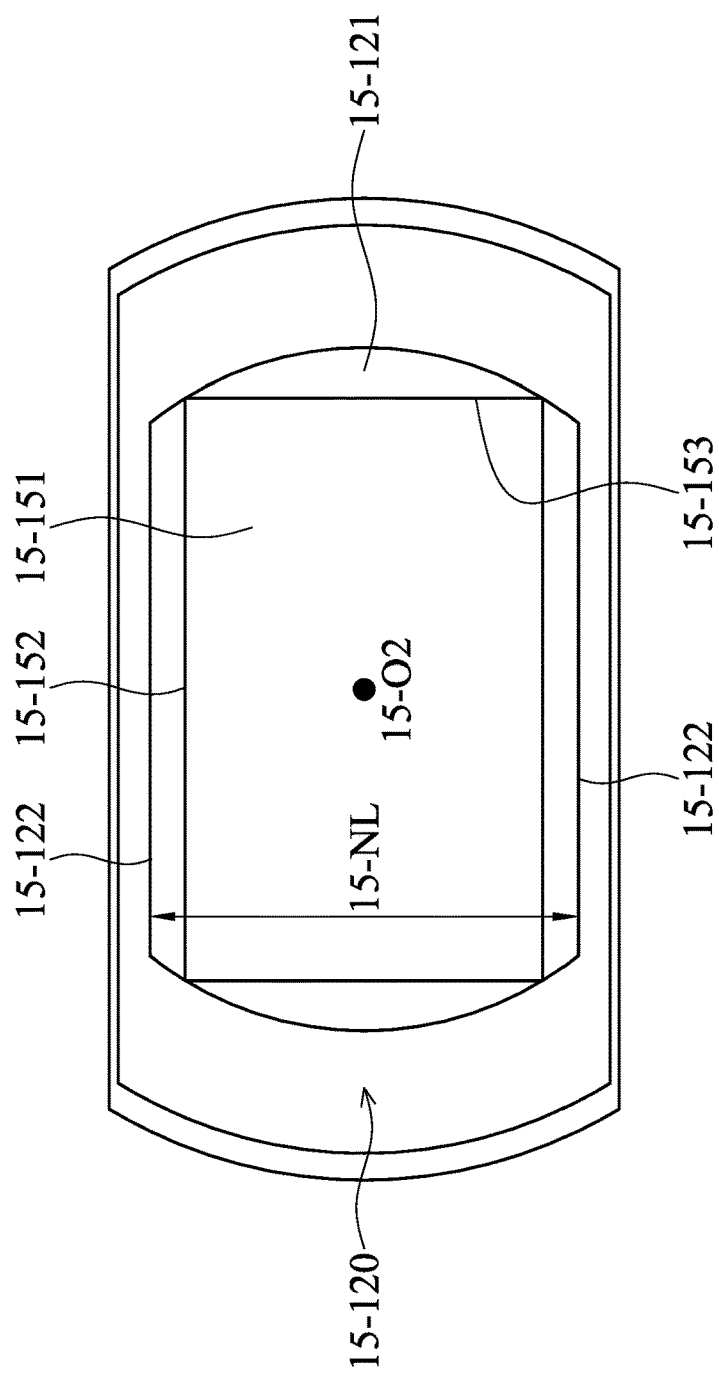
FIG. 3 is a perspective view illustrating a second optical member and a fifth optical member in accordance with an embodiment of the present disclosure.

FIG. 3 is a perspective view illustrating the second optical member 15-121 and the fifth optical member 15-151 in accordance with an embodiment of the present disclosure. As shown in FIG. 3, the second optical member 15-121 has two cutting portions 15-122 on opposite sides, and has a normal length 15-NL between the two cutting portions 15-122. The normal length 15-NL is measured in a direction (such as the Z axis) that is perpendicular to the cutting portion 15-122, and may represent the shortest distance between the two cutting portions 15-122. In addition, the fifth optical member 15-151 has a lengthwise side 15-152 and a widthwise side 15-153. Since the fifth optical member 15-151 is substantially rectangular, the lengthwise side 15-152 and the widthwise side 15-153 are substantially perpendicular to each other. In this embodiment, the length of the lengthwise side 15-152 in the Y axis is greater than the normal length 15-NL.

As set forth above, the embodiments of the present disclosure provide an optical system including a plurality of optical members, wherein some of the optical members are movable relative to some of the other optical members. Since some and not all of the optical members are movable, the design of the driving assembly may be simplified, and the space that is taken up in the driving assembly may be reduced, achieving the miniaturization of the optical system.

While the embodiments and the advantages of the present disclosure have been described above, it should be understood that those skilled in the art may make various changes, substitutions, and alterations to the present disclosure without departing from the spirit and scope of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure. As long as those may perform substantially the same function in the aforementioned embodiments and obtain substantially the same result, they may be used in accordance with some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

What is claimed is:

1. An optical system, comprising:
   a first optical module, comprising:
      a movable portion connected to a first optical member;
      a fixed portion, wherein the movable portion is movable relative to the fixed portion; and
      a driving assembly configured to drive the movable portion to move relative to the fixed portion;
   a second optical module connected to a second optical member, wherein an optical axis passes through the first optical member and the second optical member, wherein the first optical member has a first optical area on a plane that is perpendicular to the optical axis, the second optical member has a second optical area on the plane, and the first optical area is different from the second optical area;
   a third optical module connected to a third optical member, wherein the shortest distance between the first optical module and the third optical module is shorter than the shortest distance between the second optical module and the third optical module, wherein the third optical member has a third optical area on the plane, and the third optical area is smaller than the first optical area and the second optical area; and
   a fourth optical module connected to a fourth optical member, wherein the third optical module is located between the first optical module and the fourth optical module, the fourth optical member has a fourth optical area on the plane, and the fourth optical area is greater than the first optical area, wherein the fourth optical area is smaller than the second optical area.

2. The optical system as claimed in claim 1, further comprising a fifth optical module connected to a fifth optical member, wherein the shortest distance between the first optical module and the fifth optical module is longer than the shortest distance between the second optical module and the fifth optical module.

3. The optical system as claimed in claim 2, wherein the fifth optical member has a fifth optical area on the plane, and the fifth optical area is smaller than the second optical area.

4. The optical system as claimed in claim 2, further comprising a sixth optical module located between the fifth optical module and the second optical module.

5. The optical system as claimed in claim 1, wherein the first optical module is movable relative to the second optical module, and the third optical module is connected to the first optical module.

6. The optical system as claimed in claim 1, wherein the first optical module is movable relative to the second optical module, and the third optical module is connected to the second optical module.

7. The optical system as claimed in claim 1, wherein the shape of the first optical member is different from the shape of the second optical member.

8. The optical system as claimed in claim 1, further comprising a connecting member, wherein the fixed portion is bonded to the second optical module via the connecting member.

9. The optical system as claimed in claim 8, wherein each of the fixed portion and the second optical module has a surface, the surfaces are disposed to face each other, and the connecting member is disposed on the surfaces.

10. The optical system as claimed in claim 1, wherein light travels to the first optical member via the second optical member.

11. An optical system, comprising:
    a first optical module, comprising:
       a movable portion connected to a first optical member;
       a fixed portion, wherein the movable portion is movable relative to the fixed portion; and
       a driving assembly configured to drive the movable portion to move relative to the fixed portion;
    a second optical module connected to a second optical member, wherein an optical axis passes through the first optical member and the second optical member, wherein the first optical member has a first optical area on a plane that is perpendicular to the optical axis, the second optical member has a second optical area on the plane, and the first optical area is different from the second optical area;
    a third optical module connected to a third optical member, wherein the shortest distance between the first optical module and the third optical module is shorter than the shortest distance between the second optical module and the third optical module, wherein the third optical member has a third optical area on the plane, and the third optical area is smaller than the first optical area and the second optical area; and
    a fourth optical module connected to a fourth optical member, wherein the third optical module is located between the first optical module and the fourth optical module, the fourth optical member has a fourth optical area on the plane, and the fourth optical area is greater than the first optical area,
    wherein the fourth optical member has a first area on the plane that is perpendicular to the optical axis and has a second area on a plane that is parallel to the optical axis, and the first area is smaller than the second area.

12. The optical system as claimed in claim 11, wherein the second area is smaller than the second optical area.

13. An optical system, comprising:
- a first optical module, comprising:
  - a movable portion connected to a first optical member;
  - a fixed portion, wherein the movable portion is movable relative to the fixed portion; and
  - a driving assembly configured to drive the movable portion to move relative to the fixed portion;
- a second optical module connected to a second optical member, wherein an optical axis passes through the first optical member and the second optical member, wherein the first optical member has a first optical area on a plane that is perpendicular to the optical axis, the second optical member has a second optical area on the plane, and the first optical area is different from the second optical area;
- a third optical module connected to a third optical member, wherein the shortest distance between the first optical module and the third optical module is shorter than the shortest distance between the second optical module and the third optical module, wherein the third optical member has a third optical area on the plane, and the third optical area is smaller than the first optical area and the second optical area;
- a fourth optical module connected to a fourth optical member, wherein the third optical module is located between the first optical module and the fourth optical module, the fourth optical member has a fourth optical area on the plane, and the fourth optical area is greater than the first optical area; and
- a fifth optical module connected to a fifth optical member, wherein the shortest distance between the first optical module and the fifth optical module is longer than the shortest distance between the second optical module and the fifth optical module,
- wherein the second optical member has at least one cutting portion, the fifth optical member has a lengthwise side, and the length of the lengthwise side is greater than a normal length that is perpendicular to the at least one cutting portion.

* * * * *